United States Patent
Billington (10) Patent No.: US 10,139,907 B2
(45) Date of Patent: Nov. 27, 2018

(54) SYSTEMS AND METHODS FOR FOLEY-STYLE HAPTIC CONTENT CREATION

(71) Applicant: Immersion Corporation, San Jose, CA (US)

(72) Inventor: Doug Billington, Campbell, CA (US)

(73) Assignee: IMMERSION CORPORATION, San Jose, CA (US)

( * ) Notice: Subject to any disclaimer, the term of this patent is extended or adjusted under 35 U.S.C. 154(b) by 186 days.

(21) Appl. No.: 14/305,623

(22) Filed: Jun. 16, 2014

(65) Prior Publication Data
US 2015/0362993 A1 Dec. 17, 2015

(51) Int. Cl.
| | | |
|---|---|---|
| G06F 3/01 | (2006.01) | |
| G11B 27/034 | (2006.01) | |
| G11B 27/32 | (2006.01) | |
| H04N 7/025 | (2006.01) | |

(52) U.S. Cl.
CPC ............ *G06F 3/016* (2013.01); *G11B 27/034* (2013.01); *G11B 27/322* (2013.01); *H04N 7/0255* (2013.01)

(58) Field of Classification Search
CPC ......... G06F 3/016; G06F 3/16; G11B 27/322; G11B 27/30; G11B 27/34; G10H 1/0008; G10H 7/08; G09G 2370/02; H04N 21/4307
USPC ................ 345/156; 342/156, 161, 163, 303; 463/30, 38; 84/737; 340/4.21, 407.1
See application file for complete search history.

(56) References Cited

U.S. PATENT DOCUMENTS

| | | | |
|---|---|---|---|
| 4,067,049 A | 1/1978 | Kelly et al. | |
| 4,858,033 A | 8/1989 | Chippendale | |
| 5,065,251 A | * 11/1991 | Shuhart, Jr. ........ | A63B 24/0003 348/157 |
| 5,388,992 A | 2/1995 | Franklin | |
| 2003/0067440 A1 | 4/2003 | Lin | |

(Continued)

FOREIGN PATENT DOCUMENTS

| | | |
|---|---|---|
| WO | WO 1998/06099 | 2/1998 |
| WO | WO 2011/011737 | 1/2011 |

(Continued)

OTHER PUBLICATIONS

European Patent Office, Extended European Search Report, Application No. 15169840 dated Nov. 5, 2015.

*Primary Examiner* — Yogeshkumar Patel
(74) *Attorney, Agent, or Firm* — Kilpatrick Townsend & Stockton LLP (57) ABSTRACT

One illustrative system disclosed herein includes an audio input device configured to detect an audio input and transmit an audio signal associated with the audio input. The illustrative system also includes a haptic trigger device which includes a sensor, wherein the sensor is configured to transmit a sensor signal associated with an event. Further, the illustrative system includes a processor in communication with the audio input device and the haptic trigger device, the processor configured to: receive the audio signal; receive the sensor signal substantially simultaneously to receiving the audio signal; record the audio signal to an audio track; and insert a haptic effect marker into a haptic track based in part on the sensor signal, wherein the haptic track and the audio track are associated with a video.

22 Claims, 4 Drawing Sheets

(56) References Cited

U.S. PATENT DOCUMENTS

| | | | |
|---|---|---|---|
| 2004/0252851 A1* | 12/2004 | Braun | H04S 3/008 |
| | | | 381/101 |
| 2005/0252364 A1* | 11/2005 | O'Modhrain | G10H 1/0008 |
| | | | 84/737 |
| 2009/0096632 A1* | 4/2009 | Ullrich | H04N 9/8205 |
| | | | 340/4.21 |
| 2009/0128306 A1 | 5/2009 | Luden et al. | |
| 2010/0279822 A1* | 11/2010 | Ford | A63B 71/0622 |
| | | | 482/8 |
| 2011/0128132 A1 | 6/2011 | Ullrich et al. | |
| 2012/0021389 A1* | 1/2012 | Wakamoto | G09B 5/04 |
| | | | 434/156 |
| 2012/0206247 A1 | 8/2012 | Bhatia et al. | |
| 2013/0106691 A1* | 5/2013 | Rank | G06F 3/016 |
| | | | 345/156 |
| 2013/0227410 A1 | 8/2013 | Sridhara et al. | |
| 2014/0133683 A1* | 5/2014 | Robinson | H04S 3/008 |
| | | | 381/303 |
| 2014/0205260 A1* | 7/2014 | Lacroix | H04N 5/765 |
| | | | 386/201 |
| 2014/0267911 A1 | 9/2014 | Grant et al. | |
| 2015/0070146 A1 | 3/2015 | Cruz-Hernandez et al. | |
| 2015/0070150 A1 | 3/2015 | Levesque et al. | |
| 2015/0348581 A1* | 12/2015 | Kreisel | G11B 19/02 |
| | | | 720/703 |

FOREIGN PATENT DOCUMENTS

| WO | WO 2013/041152 | 3/2013 |
|---|---|---|
| WO | WO 2014/055329 | 4/2014 |

\* cited by examiner

SYSTEMS AND METHODS FOR FOLEY-STYLE HAPTIC CONTENT CREATION

FIELD OF THE INVENTION

The present invention relates to creating haptic content for videos. More specifically, the present invention relates to Foley-style creation of haptic content for videos.

BACKGROUND

With technological advances, video production (e.g., production of films, movies, and advertisements) has become increasingly important. Video production begins with filming the video. The video then enters into the post-production stage. Post-production may include adding a haptic track to the video. Haptic tracks may associate haptic effects (e.g., mechanical vibrations) with events (e.g., explosions) occurring in the video. Thus, as a viewer watches the video, the viewer may perceive the associate haptic effects. Creating a haptic track, however, can be time consuming and tedious. Accordingly, there is a need to simplify the process for adding a haptic track to a video.

SUMMARY

Embodiments of the present disclosure comprise computing devices configured for Foley-style haptic content creation. In one embodiment, a system of the present disclosure may comprise an audio input device configured to detect an audio input and transmit an audio signal associated with the audio input. The system may also comprise a haptic trigger device comprising a sensor, wherein the sensor is configured to transmit a sensor signal associated with an event. The system may further comprise a processor in communication with the audio input device and the haptic trigger device, the processor configured to: receive the audio signal; receive the sensor signal substantially simultaneously to receiving the audio signal; record the audio signal to an audio track; and insert a haptic effect marker into a haptic track based in part on the sensor signal, wherein the haptic track and the audio track are associated with a video.

In another embodiment, a method of the present disclosure may comprise: receiving an audio signal from an audio input device; and receiving a sensor signal from a haptic trigger device substantially simultaneously to receiving the audio signal. The method may further comprise recording the audio signal to an audio track; and inserting a haptic effect marker into a haptic track based in part on the sensor signal, wherein the haptic track and the audio track are associated with a video. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of Foley-Style Haptic Content Creation

One illustrative embodiment of the present disclosure comprises a computing device, such as a desktop computer. The computing device comprises a display, a memory, an audio input device (e.g., a microphone), and a processor in communication with each of these elements.

The computing device is configured for substantially simultaneously generating an audio track and a haptic track for a video. To generate the audio track, the computing device is configured to record Foley effects. Foley effects are sound effects used to replace or enhance the sounds recorded while filming a video. A Foley artist may produce the sound effects using a variety of props (e.g., cloth, gelatin, leather, metal rods, and cans) or digital effects. The Foley artist may watch the video and simultaneously manually produce all of the necessary sound effects for the video, synchronizing the sound effects with the video content. For example, the Foley artist may watch the video on the computing device's display and, at a point in the video in which a person is punched, the Foley artist may bang a phonebook against a surface. The computing device may record (e.g., via the audio input device) the sound effect to an audio track associated with the video. The Foley artist may repeat this process, producing and recording and all of the necessary sound effects for a video.

To generate the haptic track, the computing device is in communication with a haptic trigger device. In the illustrative embodiment, the haptic trigger device is external to the computing device and coupled to a prop (e.g., a coconut), which the Foley artist may use to generate a sound effect (e.g., the sound of a horse galloping).

In the illustrative embodiment, the haptic trigger device comprises a sensor (e.g., a piezoelectric sensor) for detecting the occurrence of an event. An event, as used herein, is any interaction, action, collision, or other event which occurs during operation of the haptic trigger device which can potentially comprise an associated haptic effect. The sensor is configured to transmit a sensor signal to the computing device. For example, in the illustrative embodiment, if the Foley artist manipulates (e.g., moves, tilts, or contacts) the prop to generate a sound effect, the sensor may detect the manipulation and transmit a sensor signal associated with the manipulation to the computing device. For instance, if the Foley artist bangs the coconut against another coconut to generate a sound effect, the sensor may detect the vibrations from the collision of the coconuts and transmit a sensor signal to the computing device.

In the illustrative embodiment, in response to the sensor signal, the computing device generates a haptic effect marker and digitally inserts the haptic effect marker into the haptic track. A haptic effect marker comprises timestamp data and/or frame stamp data. The timestamp data or frame stamp data may be associated with the time or frame(s) in the video, respectively, during which the event was detected. In some embodiments, the haptic effect marker may further comprise haptic effect data associated with the timestamp and/or frame stamp data. The haptic effect data is configured to cause a computing device to output an associated haptic effect upon playback of the haptic track. Thus, the Foley artist can substantially simultaneously generate the audio track and the haptic track for the video. In some embodiments, this may reduce the total amount of time it takes to produce the video.

In the illustrative embodiment, the haptic track may be integrated into the video file or saved as a separate haptic file (e.g., a .hapt file). A user may be able to playback the file(s) (e.g., via a video player) and experience the haptic effects synchronized with the video.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Foley-Style Haptic Content Creation

Figure 1:
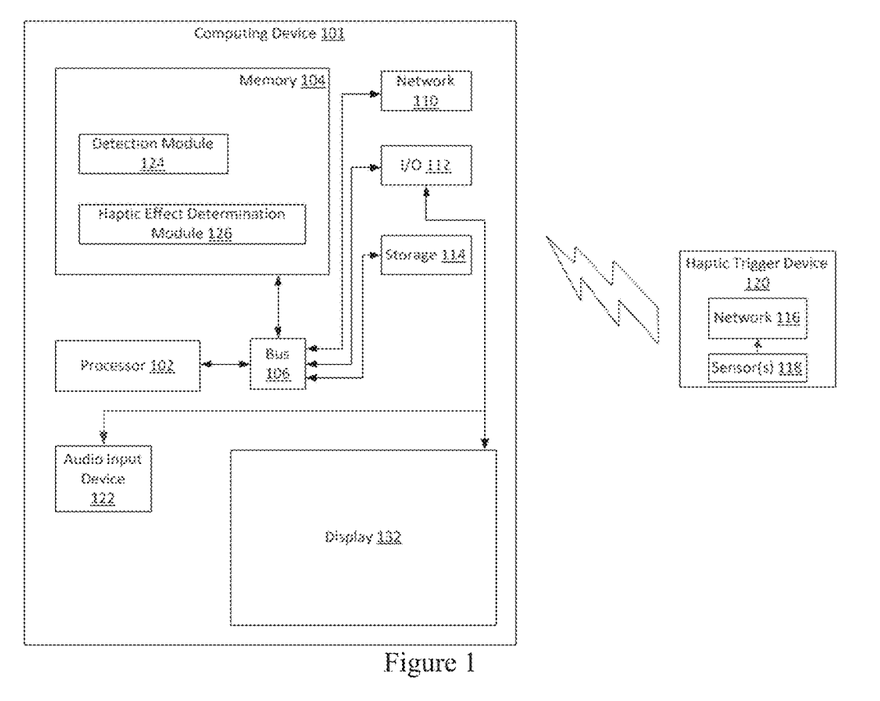
FIG. 1 is a block diagram showing a system for Foley-style haptic content creation according to one embodiment.

FIG. 1 is a block diagram showing a system 100 for Foley-style haptic content creation according to one embodiment. In the embodiment shown, system 100 comprises a computing device 101 having a processor 102 in communication with other hardware via bus 106. Computing device 101 may comprise, for example, a smartphone, tablet, laptop computer, or desktop computer. In this example, computing device 101 comprises a laptop computer.

A memory 104, which can comprise any suitable tangible (and non-transitory) computer-readable medium such as RAM, ROM, EEPROM, or the like, embodies program components that configure operation of the computing device 101. In the embodiment shown, computing device 101 further includes one or more network interface devices 110, input/output (I/O) interface components 112, and storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate a wired or wireless connection to devices such as one or more displays 132 (e.g., a computer monitor, a LED display, a head-mounted display, or 3D goggles), game controllers, keyboards, mice, joysticks, cameras, buttons, speakers, microphones, and/or other hardware used to input data or output data. Storage 114 represents nonvolatile storage such as magnetic, optical, or other storage media included in device 101 or coupled to processor 102.

Audio input device 122 is configured to receive an audio input associated with a sound effect. The audio input may comprise an analogue signal (e.g., a sound) or a digital signal (e.g., from a keyboard, mixing board, CD player, or MP3 player). The audio input device 122 transmits an audio signal associated with the audio input to the processor 102. In some embodiments, the audio input device 122 may comprise a microphone. The microphone may comprise, for example, a capacitor, an inductor, a resonant circuit, a vacuum tube, a transistor, an amplifier, a metal ribbon, carbon granules, a piezoelectric transducer, an optical fiber, a laser, a MEMS (MicroElectrical-Mechanical System), or a liquid.

Further, the system 100 comprises a haptic trigger device 120. Although the haptic trigger device 120 is depicted in FIG. 1 as being external to and in communication with the computing device 101, in some embodiments, the haptic trigger device 120 may be internal to the computing device 101. In this example, the haptic trigger device 120 includes a network device 116 for communicating with computing device 101. The network device 116 may be configured substantially the same as network device 110 in the computing device 101. That is, the network device 116 may comprise wired interfaces such as Ethernet, USB, IEEE 1394, and/or wireless interfaces such as IEEE1 802.11, Bluetooth, or radio interfaces. In some embodiments, the computing device 101 may be in communication with a single haptic trigger device 120 and, in other embodiments, the computing device 101 may be in communication with a plurality of haptic trigger devices 120.

The haptic trigger device 120 comprises one or more sensors 118. The sensor 118 is configured to transmit a sensor signal to the processor 102. In some embodiments, the sensor 118 may comprise, for example, a gyroscope, an accelerometer, a depth sensor, a camera, a phototransistor, a switch, a button, a microphone, or a piezoelectric transducer. In some embodiments, the haptic trigger device 120 may comprise a plurality of sensors 118. For example, in one embodiment, the haptic trigger device 120 may comprise a microphone and a depth sensor. In other embodiments, the haptic trigger device 120 may comprise a separate processor for determining a haptic effect and transmitting it to the computing device 120.

Turning to memory 104, program components 124 and 126 are depicted to show how a device can be configured in some embodiments for Foley-style haptic content creation. In this example, a detection module 124 configures the processor 102 to monitor the sensor 118 and/or the audio input device 122. For example, the detection module 124 may sample the sensor 118 in order to determine the presence, absence, or magnitude of a sensor signal and, if a sensor signal is present, to track the characteristics (e.g., the frequency, magnitude, duration, or waveform) of the sensor signal over time. As another example, the detection module 124 may sample the audio input device 122 in order to determine the presence, absence, or magnitude of an audio signal and, if an audio signal is present, to track the characteristics (e.g., the frequency, magnitude, duration, or waveform) of the audio signal over time.

Haptic effect determination module 126 represents a program component that analyzes data to determine a haptic effect in response to a sensor signal and/or an audio signal. Particularly, the haptic effect determination module 126 may comprise code that determines, based on the signal from the sensor 118 and/or an audio signal from the audio input device 122, a haptic effect and code that selects haptic effect data associated with the haptic effect to associate with a haptic effect marker. For example, in some embodiments, the haptic effect determination module 126 may determine a haptic effect based on the magnitude, frequency, and/or other characteristics of the sensor signal or audio signal. For instance, the haptic effect determination module 126 may determine a haptic effect comprising a strong vibration if the magnitude of the sensor signal is large.

Further, in some embodiments, the haptic effect determination module 126 may determine a haptic effect based on user input. For example, the haptic effect determination module 126 may determine a haptic effect based on a button press. As another example, the haptic effect determination module 126 may determine a haptic effect based on a user selection, e.g., from a haptic effect library or list. In another embodiment, the haptic effect may be determined, at least in part, on the audio or video signal in combination with a user input.

Figure 2:
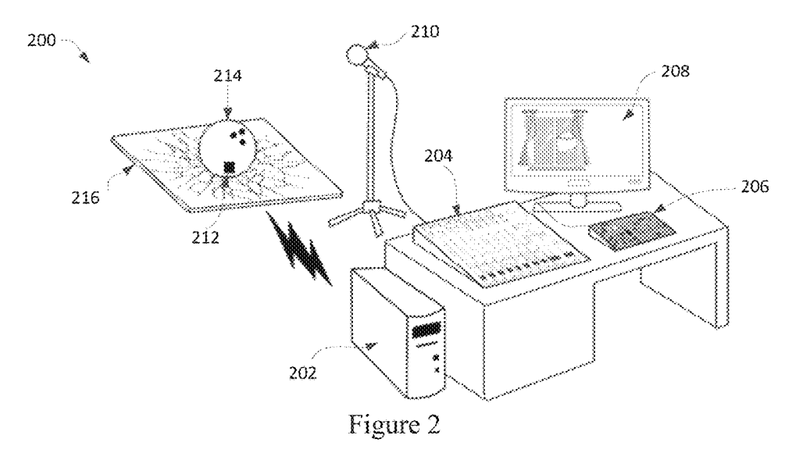
FIG. 2 shows an embodiment of a system for Foley-style haptic content creation.

FIG. 2 shows an embodiment of a system for Foley-style haptic content creation. In this example, the system 200 includes a computing device 202. The computing device 202 comprises a display 208. A user may view a video via the display 208 (e.g., for Foley effect production). In this example, the display 208 is outputting a video scene in which a baseball is breaking through a glass window.

The computing device 202 is in communication with an audio input device 210 (e.g., a microphone) for receiving an audio input. The audio input device 210 may transmit an audio signal associated with the audio input to the computing device 202. In this example, the computing device 202 is also in communication with additional audio equipment 204 (e.g., a mixing board) and controls 206, which a user (e.g., a Foley artist) may use for video post-production. However, other embodiments may not comprise the controls 206 and/or the additional audio equipment 204.

The system 200 further includes a prop 214. In this example, the prop 214 comprises a bowling ball. The user may manipulate (e.g., move, drop, or rotate) the prop 214 to generate a sound effect. For example, the user may drop the prop 214 on a surface 216 (e.g., a pane of glass) to create the sound effect (e.g., the sound of glass breaking). The computing device 202 may receive data associated with sound effect (e.g., via the audio input device 210) and insert the data into an audio track. The data may be synchronized with one or more frames of the video output on the display 408.

In the embodiment shown in FIG. 2, a haptic trigger device 212 is coupled to the prop 214. Further, in this example, the haptic trigger device 212 is in wireless communication with the computing device 202. The haptic trigger device 212 comprises a sensor, for example, an accelerometer or a gyroscope. The sensor may be configured to detect the occurrence of an event and transmit a sensor signal to the computing device 202. For example, the sensor may detect a manipulation of the prop 214 by the user and transmit a sensor signal to the computing device 202.

The computing device 202 is configured to receive the sensor signal. In some embodiments, based on the presence or characteristics of the sensor signal and/or the audio signal, the computing device 202 may determine whether to insert a haptic marker into a haptic track. For example, in some embodiments, the computing device 202 may only insert a haptic marker into the haptic track if the duration of the sensor signal and/or the audio signal exceeds a threshold amount of time (e.g., 0.5 s). In other embodiments, the computing device 202 may insert a haptic marker based on the change in directionality of a sensor signal (e.g., if the prop 214 is rotated), or the change in magnitude of the sensor signal (e.g., if the prop 214 stops moving upon contacting a surface 216). In still other embodiments, the computing device 202 may insert a haptic marker based on a change in the frequency of the sensor signal (e.g., based on characteristics of vibrations in the prop 214 upon the prop 214 contacting a surface 216). The haptic effect marker may be synchronized with the frame(s) playing in the video during which time the event occurred.

In some embodiments, the haptic effect marker may comprise haptic effect data associated with a haptic effect. The haptic effect data is configured to cause the computing device 202 to output the associated haptic effect. In some embodiments, the haptic effect data may comprise one or more characteristics of a haptic signal (e.g., the frequency, magnitude, duration, or waveform of the haptic signal) configured to generate the haptic effect. In other embodiments, the haptic effect data may comprise commands, the name of a haptic effect, for example "intense vibration," or other data that can be interpreted by the computing device 202 to output a haptic effect. In still other embodiments, the haptic effect data may comprise an algorithm, or data usable to solve an algorithm, for generating the haptic effect.

As noted above, the haptic effect data is associated with a haptic effect. The computing device 202 may determine the haptic effect. In some embodiments, the computing device 202 may determine the haptic effect based on the characteristics of the sensor signal. For example, in the embodiment shown in FIG. 2, the user may drop a bowling ball on a pane of glass to generate a sound effect comprising the sound of glass breaking. The haptic trigger device 212 may detect the movement or rotation of the bowling ball and transmit a sensor signal to the computing device 202. Based on, for example, the waveform, magnitude, frequency, or duration of the sensor signal, the computing device 202 may determine one or more haptic effects (e.g., a vibration, a surface deformation, a simulated texture, or a perceived change in a coefficient of friction). For instance, in some embodiments, the computing device 202 may determine a haptic effect comprising a vibration with a magnitude proportional to the magnitude of the sensor signal. The computing device may insert data associated with the determined haptic effect into the haptic effect marker.

In some embodiments, the computing device 202 may determine the haptic effect based on a user input. For example, in some such embodiments, prior to manipulating the prop 214 to generate a sound effect, the user may select a desired haptic effect from, e.g., a haptic effect list or library. For instance, in one embodiment, the user may select a haptic effect from a list comprising an intense vibration, a weak vibration, a perceived increase in a coefficient of friction, a perceived decrease in a coefficient of friction, or a rubber, smooth, or bumpy texture. Upon the computing device 202 detecting the sensor signal, the computing device 202 may determine a haptic effect comprising the selected haptic effect. The computing device may associate haptic effect data for generating the determined haptic effect with the haptic effect marker.

In some embodiments, haptic effect data may be associated with a haptic effect marker after the haptic effect marker has been inserted into the haptic track (e.g., upon completion of the Foley process). In some embodiments, the user may associate the haptic effect data with the haptic marker. In other embodiments, the computing device 202 may associate the haptic effect data with the haptic marker upon some action by the user, for example, upon the user selecting the desired haptic effect from a haptic effect list or library. In some embodiments, the user may be able to customize the characteristics (e.g., longer duration, shorter duration, higher intensity, or lower intensity) of the desired haptic effect and associate the haptic effect data for generating the haptic effect with the haptic effect marker.

In some embodiments, the user may download data associated with one or more haptic effects, for example, from the Internet. In some such embodiments, the computing device 202 and/or the user may associate the downloaded data with a haptic effect marker. For example, prior to manipulating the prop 214 to generate a sound effect, the user may select a downloaded haptic effect, for instance, from a haptic effect list. Upon the user manipulating the prop 214, the computing device 202 may generate a haptic effect marker comprising haptic effect data associated with the downloaded data. The computing device 202 may then insert the haptic effect marker into the haptic track.

In some embodiments, the haptic trigger device 212 may comprise the audio input device 210. That is, the system 200 may not comprise a haptic trigger device 212 separate from the audio input device 210. Rather, the audio input device 210 may act as the haptic trigger device 212. In such embodiments, the computing device 202 may determine a haptic effect based on the audio signal using any of the methods described above. For example, in some embodiments, the computing device 202 may determine a haptic effect based on the characteristics (e.g., the magnitude, frequency, duration, or waveform) of the audio signal from the audio input device 210. For instance, upon the user dropping a prop 214 onto a surface 216, the audio input device 210 may transmit an audio signal associated with the collision to the computing device 202. The computing device 202 may determine a haptic effect based on the waveform of the audio signal. Further, the computing device 202 may insert data associated with the determined haptic effect into the haptic track. Thus, in some embodiments, an audio signal may be used for both recording a sound effect for the audio track and generating a haptic effect marker for the haptic track.

Figure 3:
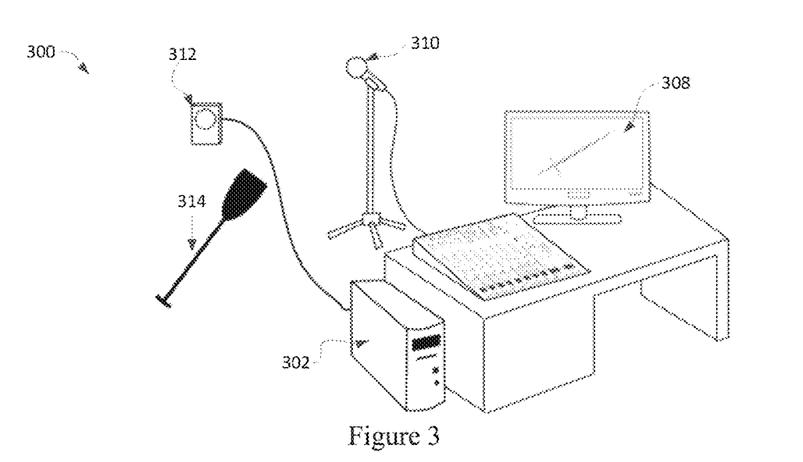
FIG. 3 shows another embodiment of a system for Foley-style haptic content creation.

FIG. 3 shows another embodiment of a system for Foley-style haptic content creation. In this example, the system 300 includes a computing device 302. The computing device 302 comprises a display 308. In the example shown, the display 308 is outputting a video scene in which a sword is being swung.

The system 300 further includes a prop 314. In this example, the prop 314 comprises a boat oar. The user may manipulate the prop 314 to generate a sound effect. For example, the user may swing the prop 314 to create the sound effect (e.g., the whoosh sound of a sword being swung). The computing device 302 may receive data associated with sound effect (e.g., via the audio input device 310) and insert the data into an audio track, which may be synchronized with the video.

In the embodiment shown in FIG. 3, a haptic trigger device 312 is remote from the prop 314. Further, in this example, the haptic trigger device 312 is in wired communication with the computing device 302. In some embodiments, the haptic trigger device 312 may comprise a camera. The camera may detect the occurrence of an event (e.g., the user manipulating the prop 314 in front of the camera). In other embodiments, the haptic trigger device 312 may comprise a phototransistor. The phototransistor may detect the occurrence of an event (e.g., the user swinging the prop 314 through an infrared light beam). Upon the occurrence of an event, the sensor may transmit a sensor signal to the computing device 302.

The computing device 302 is configured to receive the sensor signal. In some embodiments, the computing device 302 may insert a haptic marker into a haptic track associated with the video. The haptic effect marker may comprise haptic effect data associated with a haptic effect. The computing device 302 may determine the haptic effect based on one or more of the methods described with respect to FIG. 2.

The user may want to play the haptic track (e.g., while watching the video), for example, to ensure proper synchronization between the haptic track and the video. Thus, in some embodiments, the computing device 302 may comprise a haptic output device. The haptic output device may be remote from the computing device 302 but communicatively coupled to the computing device 302. For example, the haptic output device may be external to and in communication with the computing device 302 via wired interfaces such as Ethernet, USB, IEEE 1394, and/or wireless interfaces such as IEEE 802.11, Bluetooth, or radio interfaces. In some embodiments, the haptic output device may be coupled to a wearable device (e.g., a ring, jacket, sleeve, watch, wristband, bracelet, or article of clothing) that may be remote from the computing device 302.

The haptic output device may comprise a device configured to output a haptic effect comprising, for example, a vibration, a simulated a texture, a surface deformation, or a change in a perceived coefficient of friction (e.g., via capacitive coupling or an ultrasonic actuator) in response to a haptic signal. The haptic signal may be generated based on haptic effect data from the haptic track. In some embodiments, the haptic output device may comprise one or more of, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA). In some embodiments, the computing device 302 may comprise a plurality of haptic output devices, and some haptic effects may use multiple actuators and/or haptic output devices in sequence and/or in concert. Other techniques or methods may be used to output haptic effects beyond the techniques described above.

Figure 4:
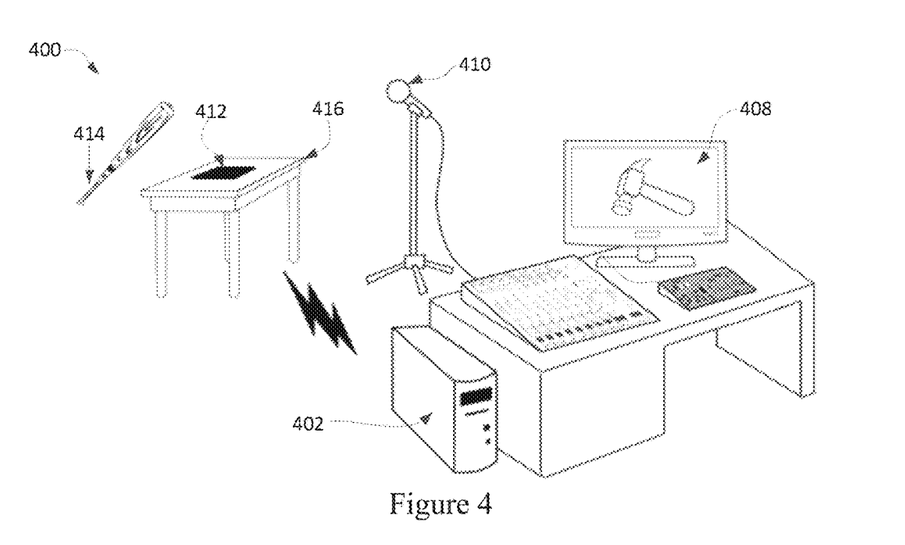
FIG. 4 shows still another embodiment of a system for Foley-style haptic content creation.

FIG. 4 shows still another embodiment of a system for Foley-style haptic content creation. In this example, the system 400 includes a computing device 402. The computing device 402 comprises a display 408. In the example shown, the display 408 is outputting a video scene in which a hammer is being hit against a piece of wood (e.g., to drive a nail into the wood).

The system 400 further includes a prop 414 (e.g., a baseball bat). The user may manipulate the prop 414 to generate a sound effect. For example, the user may bash the prop 414 against another surface 416 (e.g., a table, a floor, or a wall) to create the sound effect (e.g., the sound of a hammer hitting wood). The computing device 402 may receive data associated with the sound effect (e.g., via the audio input device 410) and, in some embodiments, insert the data directly into the video file.

In the embodiment shown in FIG. 4, a haptic trigger device 412 is remote from the prop 414. Further, in this example, the haptic trigger device 412 is in wireless communication with the computing device 402. In some embodiments, the haptic trigger device 412 may comprise pressure, strain, or force sensor. The pressure, strain, or force sensor may detect the occurrence of an event, for example, if the user strikes the prop 414 against the surface 416. In some embodiments, the haptic trigger device 412 may comprise a switch or button. In some such embodiments, the switch may be opened or closed, or the button may be pressed, upon the occurrence of an event. For example, the switch may be closed or the button may be pressed if the user hits the haptic trigger device 412 with the prop 414. Upon the occurrence of an event, the sensor may transmit a sensor signal to the computing device 402.

In some embodiments, the system 400 may comprise a plurality of haptic trigger devices 412. For example, in one embodiment, the system 400 comprises a first haptic trigger device 412 coupled to the prop 414, a second haptic trigger device 412 coupled to the surface 416, and a third haptic trigger device 412 (e.g., the audio input device 410). In some embodiments, the computing device 402 may determine one or more haptic effects and/or insert one or more haptic effect markers into a haptic track based in part on sensor signals from one or more of the haptic trigger devices 412. For example, in the embodiment described above, the computing device 402 may determine a haptic effect based on data (e.g., accelerometer data) from the first haptic trigger device 412, data (e.g., pressure data) from the second haptic trigger device 412, and/or data (e.g., audio input data) from the third haptic trigger device 412. Any number or configuration of haptic trigger devices 412 may be possible. Further, any number of haptic effect markers may be generated based on any number of sensor signals from any number of haptic trigger devices 412.

Illustrative Methods for Foley-Style Haptic Content Creation

Figure 5:
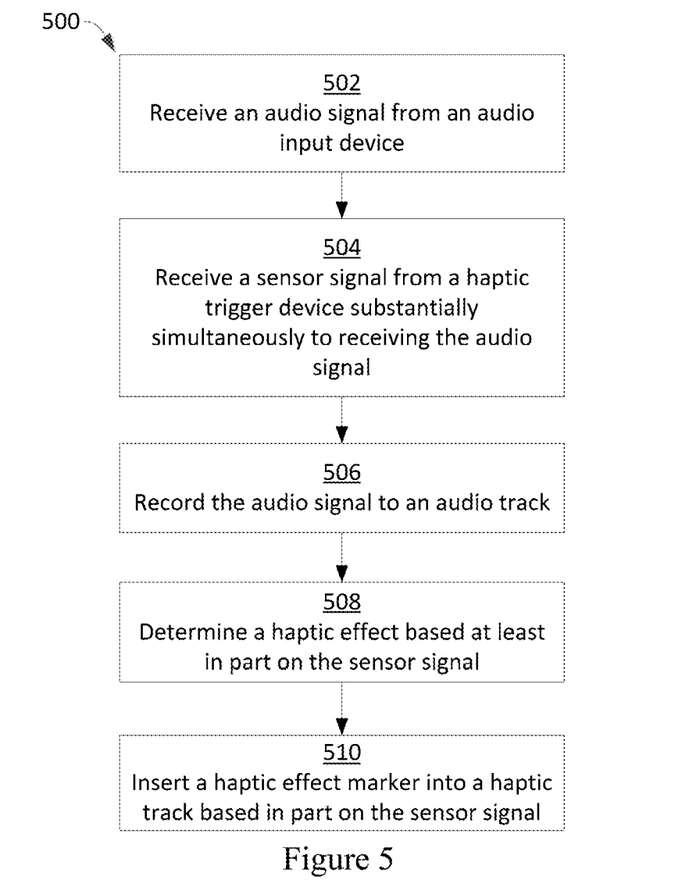
FIG. 5 is a flow chart of steps for performing a method for Foley-style haptic content creation according to one embodiment.

FIG. 5 is a flow chart of steps for performing a method for Foley-style haptic content creation. In some embodiments, the steps in FIG. 5 may be implemented in program code that is executed by a processor, for example, the processor in a general purpose computer, a mobile device, or a server. In some embodiments, these steps may be implemented by a group of processors. In some embodiments one or more steps shown in FIG. 5 may be omitted or performed in a different order. Similarly, in some embodiments, additional steps not shown in FIG. 5 may also be performed. The steps below are described with reference to components described above with regard to system 100 shown in FIG. 1.

The method 500 begins at step 502 when processor 102 receives an audio signal from an audio input device 122. In some embodiments, the audio input device 122 may comprise a microphone. The audio signal may comprise an analog signal or a digital signal. The digital signal may be from a digital device comprising, for example, another computing device 101, a MIDI keyboard, a smartphone, a radio, or a turntable station. In some embodiments, the audio signal may be associated with a sound effect.

The method 500 continues at step 502 when processor 102 receives a sensor signal from a haptic trigger device 120 substantially simultaneously to receiving the audio signal. The sensor signal may comprise an analog signal or a digital signal.

The method 500 continues at step 502 when processor 102 records the audio signal to an audio track. The audio track is associated with a video. In some embodiments, the processor 102 may directly record the audio signal to the audio track. In other embodiments, the processor 102 may manipulate the audio signal (e.g., modify the magnitude, frequency, duration, or waveform of the audio signal) and record the modified audio signal to the audio track. In some embodiments, the audio track data may be separate from the video data. In other embodiments, the audio track data may be integrated into the video data. The processor 102 may record the audio data such that it is substantially in synch with one or more frames from the video.

The method 500 continues at step 502 when processor 102 determines a haptic effect based at least in part on the sensor signal. As described above, in some embodiments, the processor 102 may determine the haptic effect based on one or more characteristics of the sensor signal. For example, the processor 102 may determine a haptic effect based on the magnitude and frequency of the sensor signal. For instance, in some embodiments, the processor 102 may determine a haptic effect with a magnitude proportional to the magnitude of the sensor signal, and a duration proportional to the duration of the sensor signal.

The method continues at step 510 when processor 102 inserts a haptic effect marker into a haptic track based in part on the sensor signal. In some embodiments, the haptic effect marker may comprise haptic effect data associated with the determined haptic effect. The processor 102 may insert the haptic effect marker into the haptic track such that the haptic effect marker is substantially in synch with one or more frames from the video.

Advantages of Foley-Style Haptic Content Creation

There are numerous advantages to Foley-style haptic content creation. For instance, in some embodiments, generating a haptic track and an audio track substantially simultaneously, rather than consecutively, may reduce the total production time for a video. Further, generating a haptic track and an audio track substantially simultaneously may reduce the cost of video production. For example, in some embodiments, rather than having a Foley artist create the audio track and a haptic artist create the haptic track, a single Foley artist can create both the audio track and the haptic track. Thus, fewer personnel may be needed to complete post-production of a video, reducing the overall cost of producing the video.

In some embodiments, Foley-style haptic content creation may make synchronizing the haptic effects, sound effects, and video content easier. This may be because the haptic effects and sound effects are generated substantially simultaneously and in synch. Thus, rather than individually synchronizing the sound effects and the haptic effects with each other and the video content, the sound effects and the haptic effects may be generated in synch.

Further, in some embodiments, Foley-style haptic content creation may improve the accuracy of the synchronization between the haptic effects, sound effects, and video content. As noted above, rather than individually synchronizing the sound effects and the haptic effects with each other and the video content, the sound effects and the haptic effects may be generated in synch. This may reduce errors in synchronization that may occur if the Foley artist tried to individually synchronize the sound effects and the haptic track with each other and the video content.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
   an audio input device configured to detect a sound effect and transmit an audio signal associated with the sound effect;
   a haptic trigger device configured to detect a manipulation of a prop and transmit a sensor signal associated with the manipulation, wherein the haptic trigger device is different from the audio input device;
   a processor in communication with the audio input device and the haptic trigger device; and
   a memory on which instructions executable by the processor are stored to cause the processor to:
   play back a pre-recorded video file; and
   while the pre-recorded video file is being played back:
   receive the audio signal; and
   receive the sensor signal substantially simultaneously to receiving the audio signal;
   based on the audio signal, record the sound effect to an audio track associated with the pre-recorded video file; and based on the sensor signal, insert a haptic effect marker into a haptic track associated with the pre-recorded video file, wherein the haptic effect marker comprises timestamp data.

2. The system of claim 1, wherein the haptic trigger device comprises a gyroscope, an accelerometer, a depth sensor, a camera, a phototransistor, a switch, a button, or a piezoelectric transducer.

3. The system of claim 1, wherein the haptic trigger device comprises a plurality of sensors.

4. The system of claim 1, wherein the prop is a hand-held device and the haptic trigger device is positioned on the prop.

5. The system of claim 4, wherein the prop is configured to be manipulated to generate the sound effect.

6. The system of claim 5, wherein the prop comprises a Foley artist prop.

7. The system of claim 1, wherein the haptic effect marker comprises haptic effect data associated with a haptic effect.

8. The system of claim 7, wherein the processor is further configured to:
prior to inserting the haptic effect marker into the haptic track, determine the haptic effect data based at least in part on the sensor signal.

9. The system of claim 1, further comprising a plurality of haptic trigger devices.

10. A method comprising:
playing back, by a processor, a pre-recorded video file; and
while playing back the pre-recorded video file:
receiving, by the processor, an audio signal from an audio input device, the audio signal comprising a sound effect;
receiving, by the processor, a sensor signal from a haptic trigger device substantially simultaneously to receiving the audio signal, the sensor signal indicating a manipulation of a prop, wherein the haptic trigger device is different from the audio input device;
based on the audio signal, recording, by the processor, the sound effect to an audio track associated with the pre-recorded video file; and
based on the sensor signal, inserting, by the processor, a haptic effect marker into a haptic track associated with the pre-recorded video file, wherein the haptic effect marker comprises timestamp data.

11. The method of claim 10, wherein the haptic trigger device comprises a plurality of sensors.

12. The method of claim 10, wherein the prop is a hand-held device and the haptic trigger device is positioned on the prop.

13. The method of claim 12, wherein the prop comprises a Foley artist prop.

14. The method of claim 10, wherein the haptic effect marker comprises haptic effect data associated with a haptic effect.

15. The method of claim 14, further comprising:
prior to inserting the haptic effect marker into the haptic track, determining the haptic effect data based at least in part on the sensor signal.

16. A non-transient computer readable medium comprising program code, which when executed by a processor is configured to cause the processor to:
play back a pre-recorded video file; and
while playing back the pre-recorded video file:
receive an audio signal from an audio input device, the audio signal comprising a sound effect;
receive a sensor signal from a haptic trigger device substantially simultaneously to receiving the audio signal, the sensor signal indicating a manipulation of a prop, wherein the haptic trigger device is different from the audio input device;
based on the audio signal, record the sound effect to an audio track associated with the pre-recorded video file; and
based on the sensor signal, insert a haptic effect marker into a haptic track associated with the pre-recorded video file, wherein the haptic effect marker comprises timestamp data.

17. The non-transient computer readable medium of claim 16, wherein the haptic trigger device comprises a plurality of sensors.

18. The non-transient computer readable medium of claim 16, wherein the prop is a hand-held device and the haptic trigger device is positioned on the prop.

19. The non-transient computer readable medium of claim 18, wherein the prop comprises a Foley artist prop.

20. The system of claim 1, wherein the haptic effect marker is configured to cause a haptic output device to output a haptic effect configured to simulate a video event in the pre-recorded video file.

21. The system of claim 1, wherein the processor is further configured to, prior to inserting the haptic effect marker into the haptic track:
select a haptic effect from among a plurality of available haptic effects; and
determine haptic effect data to be included in the haptic effect marker based on the haptic effect.

22. The system of claim 1, wherein the processor is further configured to, prior to inserting the haptic effect marker into the haptic track:
download haptic effect data from a remote data source; and
associate the haptic effect data with the haptic effect marker.

* * * * *